Aug. 4, 1942.                H. L. SMITH                2,292,168
                            INDUCTION MOTOR
                          Filed July 29, 1940           2 Sheets-Sheet 1

Inventor
Harold L. Smith
By
Attorney

Aug. 4, 1942.   H. L. SMITH   2,292,168
INDUCTION MOTOR
Filed July 29, 1940    2 Sheets-Sheet 2

Inventor
Harold L. Smith
By
Attorney

Patented Aug. 4, 1942

2,292,168

UNITED STATES PATENT OFFICE 2,292,168

INDUCTION MOTOR

Harold L. Smith, Milwaukee, Wis., assignor to The Louis Allis Company, Milwaukee, Wis., a corporation of Wisconsin Application July 29, 1940, Serial No. 348,118

5 Claims. (Cl. 172—120)

This invention relates to induction motors, and refers particularly to the relationship of the rotor and stator slots and teeth, with a view toward improving the power factor and torque characteristics of the motor.

In an induction motor having a squirrel cage rotor where the rotor teeth are encircled by complete low resistance circuits, it is desirable to have as nearly as possible a constant reluctance at the air gap over each rotor tooth as it progresses past the stator teeth.

Irregular widely varying flux distribution in the rotor which results from a varying air gap reluctance is accompanied in motors of this type by high iron losses which, of course, should be avoided.

In attacking this problem, certain factors must be borne in mind; for instance, the total rotor reactance should be kept as low as possible as the power factor and torque of the motor suffers directly with its increase. This means that there should be a greater number of teeth in the rotor than in the stator.

Another element to be considered is that the stator slots should have wide openings or entrances to permit the insertion of form wound coils.

As a further explanation of the problem involved, it is to be observed that the flux density in a rotor tooth is subject to high frequency change between wide limits whenever the reluctance at the air gap over the rotor tooth varies widely. This high frequency flux variation causes extra hysteresis and eddy current losses due to the excessive current generated in the low resistance circuit around the tooth and formed by the rotor bars and end rings.

To overcome these objections, the present invention proposes an induction motor having a rotor of the squirrel cage type wherein the ill effect of variation in flux density within any one rotor tooth is substantially nullified by so proportioning and spacing the rotor and stator teeth with respect to each other and by grouping the rotor teeth, that the air gap reluctance over any group of rotor teeth is substantially constant and the total effect is that of constant air gap reluctance over every rotor tooth as it progresses past the stator teeth and slots.

To this end, the present invention contemplates as another of its objects the provision of a simple manner of grouping the rotor teeth in multiples bearing a definite relationship to the slot pitch of the stator.

More specifically, it is an object of this invention to so connect the rotor bars of the squirrel cage winding by the end rings that the rotor teeth are arranged in groups having an arcuate length measured at the air gap which is definitely related to and is a function of the slot pitch of the stator.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which—

Figure 1:
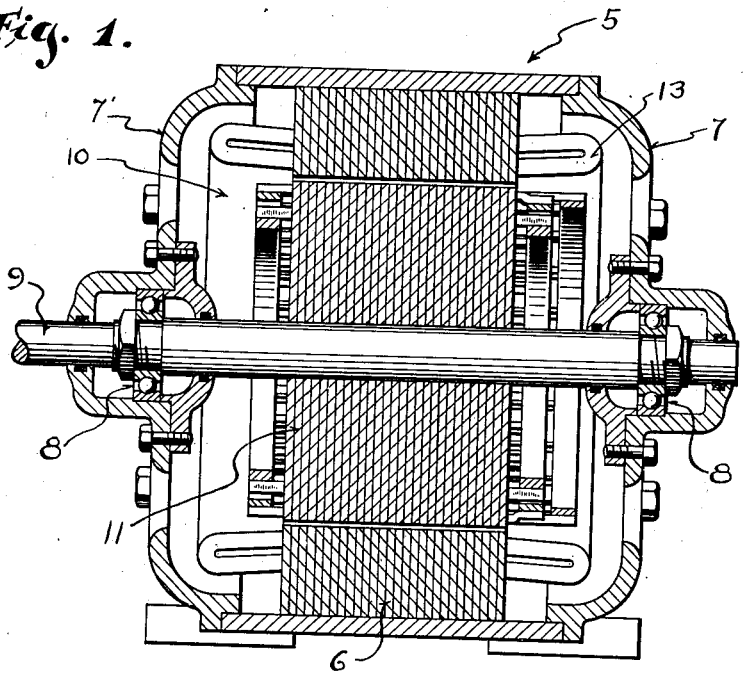
Figure 1 is a longitudinal sectional view through an induction motor of the type to which this invention appertains.

Referring now particularly to the accompanying drawings, in which like numerals indicate like parts, the numeral 5 designates generally the housing of a squirrel cage induction motor within which a laminated stator core 6 is mounted in the customary manner. The end bells 7 of the motor housing carry bearings 8 in which the shaft 9 of the rotor, indicated generally by the numeral 10, is journalled.

The rotor includes the usual laminated core 11 revolving within the stator core 6. The stator and the rotor cores have slots opening to the air gap or clearance between the stator and rotor cores.

Figure 2:
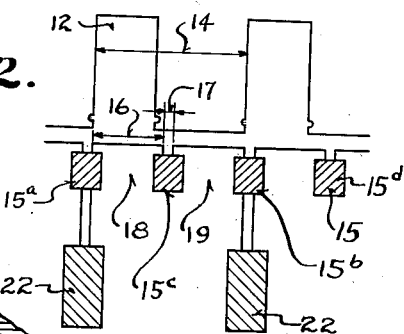
Figure 2 is a diagrammatic view illustrating the relationship of the rotor and stator teeth in the motor illustrated in Figure 1.
Figure 3:
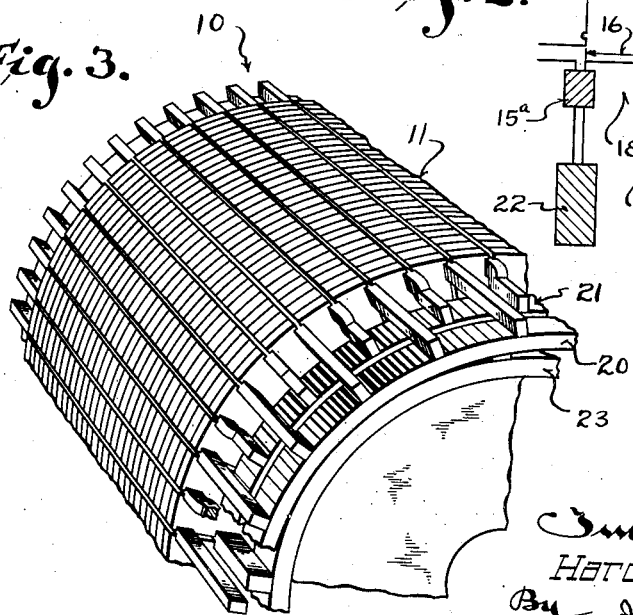
Figure 3 is a perspective view illustrating part of the rotor of the motor shown in Figure 1.
Figure 4:
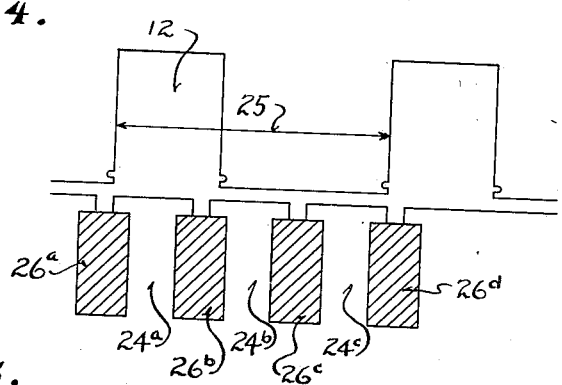
Figures 4 and 5 are diagrammatic views similar to Figure 2 illustrating different stator-rotor tooth relationships which may be used to apply the principle of this invention.
Figure 5:
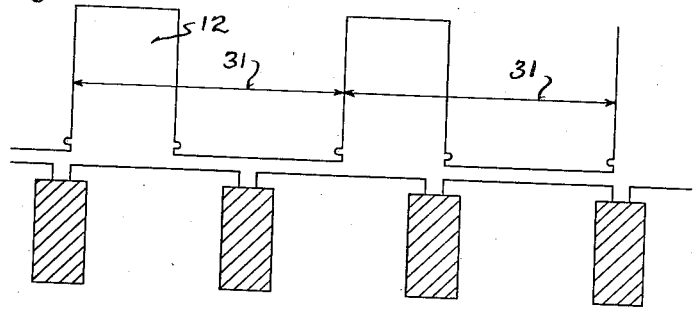

In the case of the stator, the slots 12, as best shown in Figures 2, 4 and 5 have wide, open mouths to permit the insertion of form wound coils 13. The slots of the rotor contain the bars of the secondary winding.

The invention is not limited to either the single or the double cage construction, as will be described hereinafter.

Inasmuch as the reluctance at the air gap over any given rotor tooth is minimum when the rotor tooth is opposite a stator tooth and is maximum when the rotor tooth is opposite a stator slot, the flux density within the rotor tooth tends to undergo a wide variation at high frequency. Any such variation causes extra hysteresis and eddy currents in the rotor tooth laminae. However, the "shading" effect of the closed circuit around the tooth in the ordinary squirrel cage motor resists this flux density variation, but in doing so causes high rotor bar $I^2R$ losses, which tends to increase the effective resistance of the complete rotor.

To overcome the disadvantages inherent in these consequences, the rotor teeth are so grouped in the present invention that the sum of the reluctance over the teeth of the group is always constant. This desideratum is achieved through the conjoint effect of a particular relationship between the proportioning and spacing of the rotor and stator teeth and the novel manner in which the rotor teeth are grouped. This may be readily understood from the following explanation which has specific reference to the diagrammatic illustration of Figure 2.

The slot pitch of the stator is the dimension 14. The spacing of the top bars 15 of the rotor secondary, which in this instance is of the double cage type, is so related to the stator slot pitch 14 that the sum of two adjacent rotor teeth widths, each indicated by the dimension 16, plus the gap designated by the dimension 17, substantially equals the stator slot pitch 14. In actual practice the sum mentioned may vary between 95 and 105 per cent of the stator slot pitch.

In the position shown (in Figure 2) the reluctance at the air gap over one of the rotor teeth designated 18 is maximum as it lies directly under a stator slot; while the reluctance at the air gap over the other of the two rotor teeth (designated 19) is minimum, as it lies directly under a stator tooth.

To group these teeth 18 and 19 so that the increasing flux density in one compensates the decreasing flux density in the other, the rotor bars 15a and 15b, at the outer sides of the two teeth, are electrically connected to each other but electrically insulated from the middle rotor bar 15c. This is effected by having the rotor bars 15a and 15b joined to a common end ring 20 at one end of the rotor, while the rotor bar 15c is electrically connected with the rotor bar 15d next adjacent to the bar 15b through a second end ring 21. At the opposite end of the rotor, all of the bars may be connected to a common end ring.

Hence, the rotor bars are divided into two groups: one comprising the alternate bars 15a and 15b, and the other comprising the alternate and intermediate bars 15c and 15d. In this manner, the bars with their end rings, form overlapping closed circuits about groups of rotor teeth, each group, in this instance, consisting of two adjacent teeth.

There is, thus, a definite relationship between the proportions and spacing of the rotor and stator teeth and the grouping of the rotor teeth, with the result that the effective reluctance over the rotor teeth is constant. In other words, while the flux in the individual teeth varies due to the changing reluctance over the individual teeth, the sum of the flux of the two teeth of every group is always constant; for as the flux density rises in one, it decreases in the other. The total flux variation in the teeth of the group is thus zero and no circulating rotor bar currents are set up.

If the rotor is of the double squirrel cage type, the bottom bars are located under only alternate top bars so that the width of the teeth defined by these bottom bars 22 is substantially equivalent to the stator slot pitch 14.

The problem of varying flux densities is, thus, ineffective on the lower winding, for it is the sum of the flux flowing down the two teeth above the lower tooth which flows into the lower tooth. These lower bars are preferably connected to a separate end ring 23 at that end of the rotor at which the rings 20 and 21 are located.

The invention is not limited to any particular number of rotor teeth in one group and in Figures 4 and 5, two different group arrangements are illustrated. In Figure 4, there are three teeth, 24a, 24b, and 24c included in one group.

The total arcuate length of this group of three teeth, measured at the air gap, equals the stator slot pitch 25 To band the three teeth 24a, 24b, and 24c into one group, the outermost rotor bars 26a and 26d are electrically connected by end rings at opposite ends of the rotor while the included rotor bars 26b and 26c are electrically insulated therefrom.

Figure 6:
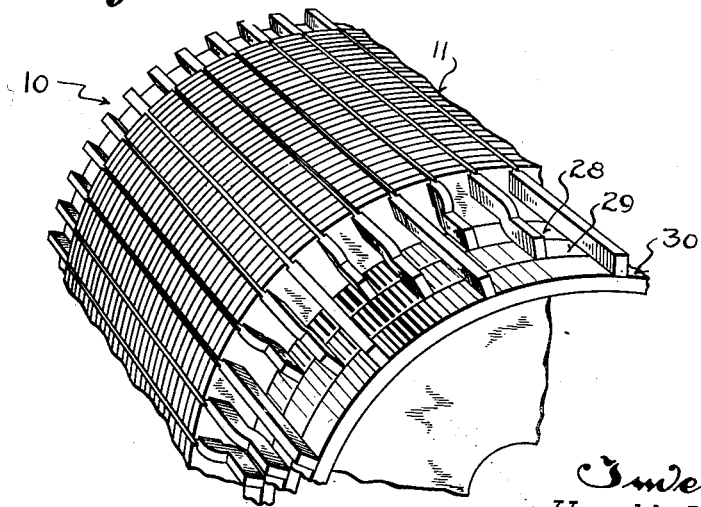
Figure 6 is a perspective view similar to Figure 3 and illustrating the mechanical construction of that form of this invention represented in Figures 4 and 5.

In this instance, there being two rotor bars lying within the group of rotor teeth, it follows that there are three sets of overlapping closed circuits which requires three separate end rings at one end of the rotor, as indicated by the numerals 28, 29, and 30 in Figure 6.

In both of the illustrations presented thus far, the total arcuate length of the group of rotor teeth, measured at the air gap, substantially equals the stator slot pitch.

The same desirable results can also be achieved where the relative spacing of stator and rotor teeth is such that the arcuate length of the group of rotor teeth, measured at the air gap, equals the sum of two stator slot pitches 31, as in Figure 5.

The results are the same for this embodiment of the invention; and as the rotor teeth are grouped in the same manner as in Figure 4, further discussion of the arrangement shown in Figure 5 is unnecessary.

From the foregoing description taken in connection with the accompanying drawings, it will be readily apparent to those skilled in the art that this invention attains a very desirable objective through the novel cooperation between a particular relationship between the spacing of the stator and rotor teeth and the grouping of the rotor teeth through the use of multiple electrically insulated end rings at least at one end of the rotor and to which the rotor bars are connected alternately or in series, depending upon the number of teeth in each rotor group.

What I claim as my invention is:

1. In an induction motor: a stator core having equi-spaced slots defining teeth; a rotor core having equi-spaced slots for the reception of a cast secondary winding, the minimum width of the rotor slots being determined by good casting practice, said rotor slots defining teeth, a predetermined number of adjacent rotor teeth and intervening slots constituting a rotor group; the spacing of the slots and the relative width of the teeth of the stator and rotor being so proportioned that the arcuate length of any group of rotor teeth measured at the air gap is substantially equal to the combined arcuate length of a multiple of adjacent stator teeth and slots which multiple consists of at least one stator tooth and one slot and in which the number of teeth and slots is less than the number of teeth and slots comprising the rotor group; cast secondary winding bars in the slots of the rotor; and a plurality of end rings connected with the bars, there being one end ring having all of the bars connected thereto at one end of the rotor, and a number of end rings at the opposite end of the rotor equal to the number of teeth in each rotor group and so connected with the adjacent ends of the bars as to form circumferentially overlapping closed circuits around said groups of rotor teeth, with bars in adjacent rotor slots in electrically independent circuits.

2. In an induction motor: a stator core; a rotor core, the stator core having equispaced slots opening to the air gap; the rotor core having top and bottom slots, the former being adjacent to the peripheral surface of the rotor core and the latter being spaced inwardly therefrom; the relative spacing of the stator and rotor slots being such that the combined arcuate length of two adjacent rotor teeth and the intervening space therebetween measured at the air gap is substantially equal to the slot pitch of the stator, and the bottom slots of the rotor being under only alternate top slots and being so spaced that the teeth defined thereby have a pitch measured at the air gap which minus one top slot opening is approximately equal to the stator slot pitch; conductor bars in the rotor slots; common end rings for all the conductor bars of the lower slots; and two electrically insulated end rings, each connected with alternate conductor bars in the top slots at least at one end of the rotor.

3. In an induction motor having a stator and a rotor core rotatable within the stator with an air gap therebetween: equispaced teeth on the rotor core separated by equispaced peripheral slots opening to said air gap; equispaced teeth on the stator separated by equispaced slots opening to said air gap; the spacing of the slots and teeth of the stator and rotor being so related that the peripheral arcuate length of any group of adjacent rotor teeth and slots consisting of at least two adjacent rotor teeth and an equal number of rotor slots less one, measured at the air gap, is substantially equal to the combined arcuate length of a multiple of adjacent stator teeth and slots measured at the air gap which multiple consists of an equal number of stator teeth and slots and at least one stator tooth and one slot, and in which multiple the number of stator teeth and slots is less than the number of teeth and slots comprising the rotor group.

4. In an induction motor having a stator and a rotor core rotatable within the stator with an air gap therebetween: equispaced teeth on the stator separated by equispaced wide open slots opening to the air gap; equispaced teeth on the rotor core separated by equispaced peripheral slots opening to the air gap and adapted to receive a secondary winding therein; the spacing and proportions of the slots and teeth of the stator and rotor being so related that the peripheral arcuate length of any group of rotor teeth and slots consisting of at least two adjacent rotor teeth and an equal number of rotor slots less one, measured at the air gap, is substantially equal to the combined arcuate length of a multiple of adjacent stator teeth and slots measured at the air gap which multiple consists of equal numbers of stator teeth and slots and at least one stator tooth and one slot, and in which multiple the number of stator teeth and slots is less than the number of teeth and slots comprising the rotor group; secondary winding bars in the rotor slots; and means electrically connecting the bars to form a closed circuit around the teeth of each rotor group with bars in adjacent rotor slots in electrically independent circuits.

5. In an induction motor having a stator and a rotor rotatable within the stator with an air gap therebetween: equispaced teeth on the stator separated by equispaced stator slots; equispaced teeth on the rotor core separated by equispaced peripheral slots opening to the air gap, said rotor slots being adapted to receive a secondary winding, at least two adjacent rotor teeth and intervening slots constituting a rotor group; the spacing and proportions of the teeth and slots of the stator and rotor being so related that the peripheral arcuate length of any group of rotor teeth, measured at the air gap, is substantially equal to the combined arcuate length of a multiple of adjacent stator teeth and slots which multiple consists of an equal number of stator teeth and slots and at least one stator tooth and one slot, and in which multiple the number of teeth and slots is less than the number of teeth and slots comprising the rotor groups; secondary winding bars in the rotor slots; and means at the ends of the rotor core cooperating with the winding bars to form circumferentially overlapping closed circuits around said groups of rotor teeth with bars in adjacent rotor slots in electrically independent circuits.

HAROLD L. SMITH.